United States Patent
Sakate et al.

(10) Patent No.: US 6,294,029 B1
(45) Date of Patent: Sep. 25, 2001

(54) METHOD OF TREATING AND SMOOTHING SLIDING SURFACE

(75) Inventors: Nobuo Sakate; Masahiko Shibahara, both of Hiroshima (JP)

(73) Assignee: Mazda Motor Corporation, Hiroshima-Ken (JP)

( * ) Notice: Subject to any disclaimer, the term of this patent is extended or adjusted under 35 U.S.C. 154(b) by 0 days.

(21) Appl. No.: 09/468,387

(22) Filed: Dec. 20, 1999

(30) Foreign Application Priority Data

Dec. 24, 1998 (JP) .................................................. 10-366530
Nov. 2, 1999 (JP) .................................................. 11-312078

(51) Int. Cl.⁷ .................................................. C23C 8/06
(52) U.S. Cl. ........................ 148/211; 148/217; 148/226
(58) Field of Search .................................. 148/211, 217, 148/226

(56) References Cited

U.S. PATENT DOCUMENTS 4,873,150 * 10/1989 Doi et al. .............................. 428/627
5,217,931 * 6/1993 Takami et al. .......................... 501/88
5,543,371 * 8/1996 Katayama et al. ...................... 501/97
5,611,250 * 3/1997 Narai et al. ............................. 74/569
5,770,322 * 6/1998 Nishioka et al. ...................... 428/627
5,885,690 * 3/1999 Sada ..................................... 428/141

FOREIGN PATENT DOCUMENTS

07118832    5/1995 (JP).
09302454 * 11/1997 (JP).

* cited by examiner

*Primary Examiner*—Roy King
*Assistant Examiner*—Nicole Coy
(74) *Attorney, Agent, or Firm*—Brooks & Kushman P.C.

(57) ABSTRACT

A surface treating and smoothing method of surface-treating and smoothing a sliding member including steps of finishing the sliding member by pressurized particle containing fluid blasting to a sliding surface with surface roughness ranging approximately 0.02 to 0.7 μmRa after pre-finishing it to a surface with surface roughness lower than lower one of a surface roughness of a counter member and 0.2 μmRa, treating the sliding member by salt-bath nitrocarburizing so as to provide the sliding member with surface hardness higher than surface hardness of the counter member but lower than 1500 Hv, and driving the sliding member and the counter member so as to slide on each other for running-in, thereby smoothing the surfaces of the sliding member and the counter member.

10 Claims, 7 Drawing Sheets

METHOD OF TREATING AND SMOOTHING SLIDING SURFACE

BACKGROUND OF THE INVENTION

1. Field of the Invention

The present invention relates to a method of treating and smoothing a surface of a sliding member and a counter member such as a shim and a cam for driving a valve of an engine.

2. Description of the Related Art

Typically, intake valves and exhaust valves of an engine are driven by cams on camshafts. Such a cam moves keeping in contact with a cam follower such as a tappet at the top of the valve and a shim or a rocker arm attached to the tappet. Since frictional resistance between these cam and cam follower is one of causes of engine output loss, it is preferred to make a sliding surface of the member as smooth like a mirror surface as possible so as to lower its frictional resistance against the counter member. It has been proposed to finish a member that slides keeping in contact with a cam to a sliding surface with a surface roughness of less than 0.3 $\mu$mRz (in terms of ten point average roughness) and apply a coating of a material having a hardness higher than 100 Hv such as titanium oxides to the sliding surface by arc discharge ion plating. One of such techniques is known from, for instance, Japanese Unexamined Patent Publication No. 7 - 118832, entitled "Sliding Member and its Production. According to the technique," a sliding surface of a member is formed with droplets of titanium oxide thereon by coating a titanium oxide on titanium stuck on the sliding surface so as to form fine protrusions thereon. While the sliding member slides with its sliding surface kept in contact with a cam surface at the beginning of use, the fine protrusions, on one hand, polish the cam surface to a mirror surface and on the other hand are removed by the cam surface from the sliding member. Another technique that is described in Japanese Unexamined Patent Publication No. 9 - 302454, entitled "Pre-Treatment of Carburizing Quenched Material And Manufacture," a sliding member is polished to a surface with a roughness between approximately 6 and 25 $\mu$mRy (in terms of maximum roughness) by shot peening and subsequently treated by carburizing and quenching. By means of this technique, while the sliding member slides with its sliding surface kept in contact with a counter member at the beginning of use, an abnormally carburized surface layer on the sliding member is removed, so as to smooth the sliding surface of the sliding member due to an adaptation effect between the two members.

In the former smoothing technique described in Japanese Unexamined Patent Publication No. 7 - 118832, although control of a current density can govern the droplet density to some extent, it is difficult to realize stable control of the droplet density. If the droplet density is low, it is hard to smooth sufficiently a sliding surface of a counter member, and, conversely, if it is high, scuffing or light seizing is apt to occur in the sliding surface. Because the size, height and position of droplet are hardly controllable, manufacturing variations of the sliding member are great. In addition the arc discharge ionic plating causes an increase in manufacturing costs of the sliding member. On the other hand, the alternative technique described in Japanese Unexamined Patent Publication No. 9 - 302454, while the running-in of a sliding member, which is primarily performed with an attention of removing an abnormally carburized surface layer on the sliding member at the beginning of use, can lower the surface roughness of the sliding member, however, since the surface roughness of the sliding member before the carburizing and quenching treatment is significantly high, the smoothness of a sliding surface that is provided by the alternative technique is limited. Furthermore, it is hard for a sliding surface of the counter member to be smoothed because the alternative technique does not take into consideration the surface roughness of the sliding member.

The term "surface roughness ($\mu$mRa)" as used in the specification shall mean and refer to an arithmetic average roughness Ra measured in $\mu$m. When taking X-axis and Y-axis in the direction of the average line of a roughness curve sampled by a standard length l, and in the direction of the average line of a roughness curve, respectively, and expressing the roughness curve by a function y=f(x), the arithmetic average roughness Ra is given by the following expression:

$$Ra = 1/l \left\{ \int_o^l |f(x)| dx \right\}$$

SUMMARY OF THE INVENTION

It is therefore an object of the present invention to provide a method of treating and smoothing a sliding surface of a sliding member such as a cam follower by which the sliding member with sliding frictional resistance reduced relatively to a counter member such as a cam is provided at low costs.

The foregoing object of the present invention is achieved by applying surface treatment to a sliding member, such as a cam follower installed in a valve drive system of an engine, cooperative to slide on a counter member, such as a valve drive cam, with the surface kept in contact with a surface of the counter member which is finished by pressurized particle containing fluid blasting to a sliding surface with surface roughness ranging approximately 0.01 to 1.0 $\mu$mRa so as to provide the sliding member with surface higher than surface hardness of the counter member. Specifically, the surface treating method of the present invention comprises the steps of pre-finishing the sliding member to a surface with surface roughness lower than surface roughness of the counter member, blasting pressurized fluid containing particles harder than the surface of the sliding member on the surface of the sliding member to finish the sliding member to a surface with surface roughness ranging approximately 0.01 to 1.0$\mu$mRa, and hardening the surface of the sliding member to surface hardness higher than surface hardness of the counter member.

According to the surface treating method, the sliding member is pre-finished by, for instance grinding and polishing, to a relatively smooth surface with surface roughness lower than the surface roughness of the counter member. When applying pressurized fluid containing particles harder than the surface of the sliding member to the surface of the sliding member by shot blasting, the surface of the sliding member with relatively low surface roughness is formed with a number of minute projections that are separately and approximately uniformly distributed over the surface of the sliding member. If the lower limit surface roughness 0.01 $\mu$mRa is exceeded, it is difficult to smooth sufficiently a sliding surface of the counter member during running-in operation and, on the other hand, if the upper limit surface roughness 1.0 $\mu$mRa is exceeded, it is difficult to smooth the sliding member. Before or after forming the projections, the sliding member at the sliding surface is hardened. Since the projections are harder than the counter member, they polish and smooth the surface of the counter member during running-in operation. At the same time since the projections, which are minute and distributed separately from one another, are below in hardness than 1500 Hv although harder than the counter member, they are easily rent apart from the sliding member and smoothed during running-in operation. As a result, the sliding frictional resistance between the sliding member and the counter member becomes very low. In addition, since it is possible to form and distribute the projections uniformly over the surface of the sliding member through a simple treatment, a certain drop in sliding frictional resistance between the sliding member and the counter member is realized constantly at low costs.

The sliding member is preferably pre-finished to a surface with surface roughness lower than 0.2, μmRa with an effect of forming more uniform projections by the pressurized particle containing fluid blasting and providing a more smooth surface of the sliding member through sunning-in operation.

The surface of the sliding member is preferably treated and finished by the pressurized particle containing fluid blasting to a surface roughness ranging approximately 0.02 to 0.7 μmRa. This leads to a further drop in sliding frictional resistance between the sliding member and the counter member.

Hardening the surface of the sliding member to surface hardness lower than 1500 Hv realizes creation of a well smoothed surface of the counter member and creation of a certainly smoothed surface of the sliding member during running-in operation. The hardening of sliding member is accomplished by penetrating and diffusing an element in a surface layer of the sliding member, i.e. diffusion metalizing, so as thereby to form a hard surface layer of a compound of the element which has surface hardness higher than surface hardness of the counter member. Nitriding, carburizing or boronizing may be employed to penetrate and diffuse an element, namely nitrogen, carbon or boron, as the element in the surface layer of the sliding member.

The sliding member may be further treated by carburizing and quenching and thereafter polished to a surface with surface roughness lower than that of the surface of the counter member. The carburizing and quenching provides an increased total case depth and increased hardness of the surface layer. In consequence, the sliding member keeps the hardness of surface layer even when polished after the treatment by carburizing and quenching. In the event where the sliding member is provided with specified surface hardness by carburizing and quenching, it is not necessary to apply diffusion metalizing tot he sliding member additionally. On the other hand, if there is the necessity to make the surface of the sliding member more harder, the pressurized particle containing fluid blasting may be applied to the sliding member after the application of diffusion metalizing so as to provide different hardness at the surface and in the surface layer of the sliding member.

According to another embodiment of the present invention, the surface treating method comprises the steps of blasting pressurized fluid containing particles harder than the surface of the sliding member on the surface of the sliding member to finish the sliding member to a surface with surface roughness ranging approximately 0.02 to 0.7 μmRa after pre-finishing the sliding member to a surface with surface roughness lower than a lower one of 1.0 μmRa and surface roughness of the counter member, and penetrating and diffusing an element in a surface layer of said sliding member so as thereby to form a hard compound surface layer whose hardness is higher than said surface hardness of said counter member but lower than 1500 Hv.

In this embodiment, the minute projections, which are formed separately and uniformly over the surface of the sliding member by the pressurized particle containing fluid blasting, are hardened by the diffusion metalizing. Since an element is penetrated and diffused in a surface layer of the sliding member during application of the diffusion metalizing, it has no effect on the surface of the sliding member. As a result, the projections on the surface of the sliding member do not cause any change in shape and keep the surface roughness provided by the pressurized particle containing fluid blasting. In the event where the diffusion metalizing is applied to the sliding member before the pressurized particle containing fluid blasting, there is a possibility that the pressurized particle containing fluid blasting shaves off partly the hard compound surface layer if the hard compound surface layer is thin. Accordingly, applying the diffusion metalizing after the pressurized particle containing fluid blasting effectively increases hardness of the projections on the sliding member. When running-in the sliding member thus prepared and the counter member to slide on each other with their surfaces kept in contact with each other, the projections of the sliding member polish and smooth the surface of the counter member and are simultaneously shaved off by the counter member to form a smooth surface on the sliding member. This provides frictional resistance between these sliding member and counter member controlled to a lowest limit.

According to another aspect of the present invention, a surface smoothing method of smoothing surfaces of a sliding member and a counter member which slide on each other with the surfaces thereof kept in contact with each other comprises the steps of providing a sliding member by pre-finishing it to a surface with surface roughness lower than surface roughness of the counter member, blasting pressurized fluid containing particles harder than the surface of the sliding member on the surface of the sliding member to finish the sliding member to a surface with surface roughness ranging approximately 0.01 to 1.0 μmRa, and hardening the surface of the sliding member to surface hardness higher than surface hardness of the counter member, installing the sliding member and the counter member with the surfaces thereof in contact with each other; and driving both members so as to slide on each other for running-in, thereby smoothing the surfaces of both members.

The surfaces of the sliding member and the counter member are finished so as to gain resultant surface roughness of both members smaller than 0.2 μmRa after initial running-in operation. This provides frictional resistance between these sliding member and counter member controlled to a lowest limit. The resultant surface roughness is given by the following expression:

Resultant surface roughness=$\{(\text{surface roughness of the sliding member})^2+(\text{surface roughness of the counter member})^2\}^{1/2}$

BRIEF DESCRIPTION OF THE ACCOMPANYING DRAWINGS

The foregoing and other objects and features of the present invention will be clearly understood when reading the following description regarding preferred embodiments thereof in conjunction with the accompanying drawings, in which.

DETAILED DESCRIPTION OF THE PREFERRED EMBODIMENTS

Figure 1:
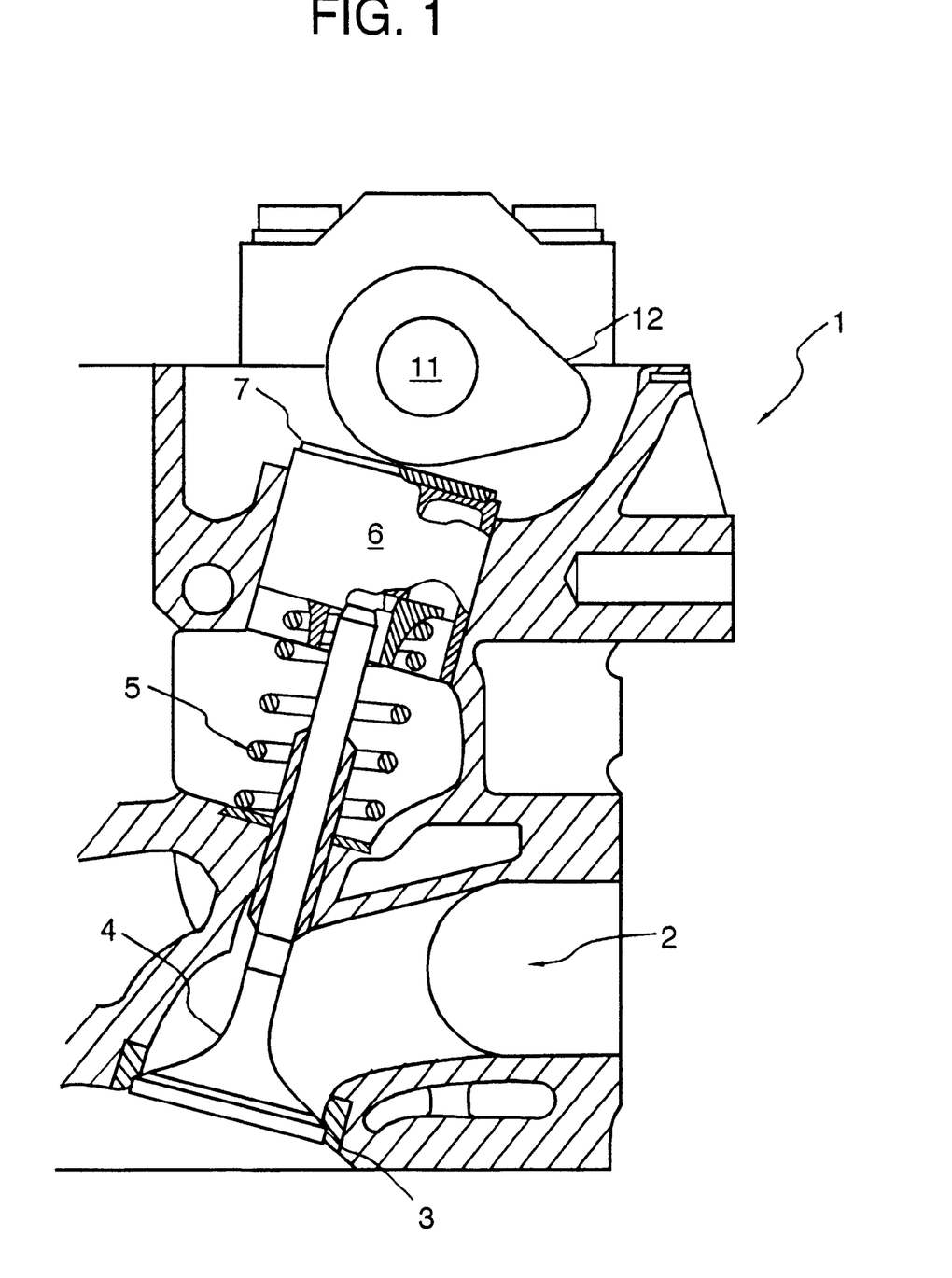
FIG. 1 is a cross sectional view of essential part of a cylinder head provided with a direct drive type of exhaust valve drive system into which a shim and a cam prepared by a surface treating and smoothing method of the present invention are installed.

Referring to the drawings in detail, and, in particular, to FIG. 1 which shows a cylinder head 1 equipped with a direct driving type of exhaust valve system in which a shim 7 on the top of a tappet 6 and a cam 12 are installed, the cylinder head 1 has a valve seat 3 at an extreme end of an exhaust port 2. An exhaust valve head 4a at its valve face is situated and forced against the valve seat 3 by means of a valve spring 5. The shim 7 on the top of the tappet 6 is installed to adjust a clearance between the tappet 6 and the cam 12. A camshaft 11 on which there is one cam 12 for each valve in the engine is turned at one-half crankshaft speed by a gear or pulley and a timing chain or a toothed timing belt (not shown). When the camshaft 11 turns at one-half crankshaft speed, the cam 12 pushes the exhaust valve 4 against the valve spring 5 through the shim 7 and tappet 6 to close the exhaust port 2. During a turn of the cam 12, the cam 12 is kept in sliding contact with the shim 7. That is to say, the shim 7 works as a cam follower that is referred to as a sliding member in regard to the cam 12 as a counter member and the contact surfaces of the shim 7 and the cam 12 from sliding surfaces. The cylinder head 1 is equipped with an intake valve system that is the same in construction and operation as the exhaust valve system. Both shim 7 and the cam 12 are finished to smooth sliding surfaces so as to be as small in frictional resistance between them as possible. In order to make the sliding surface smooth, it is necessary to apply an appropriate surface treat such as described below on the shim 7 first.

Figure 2:
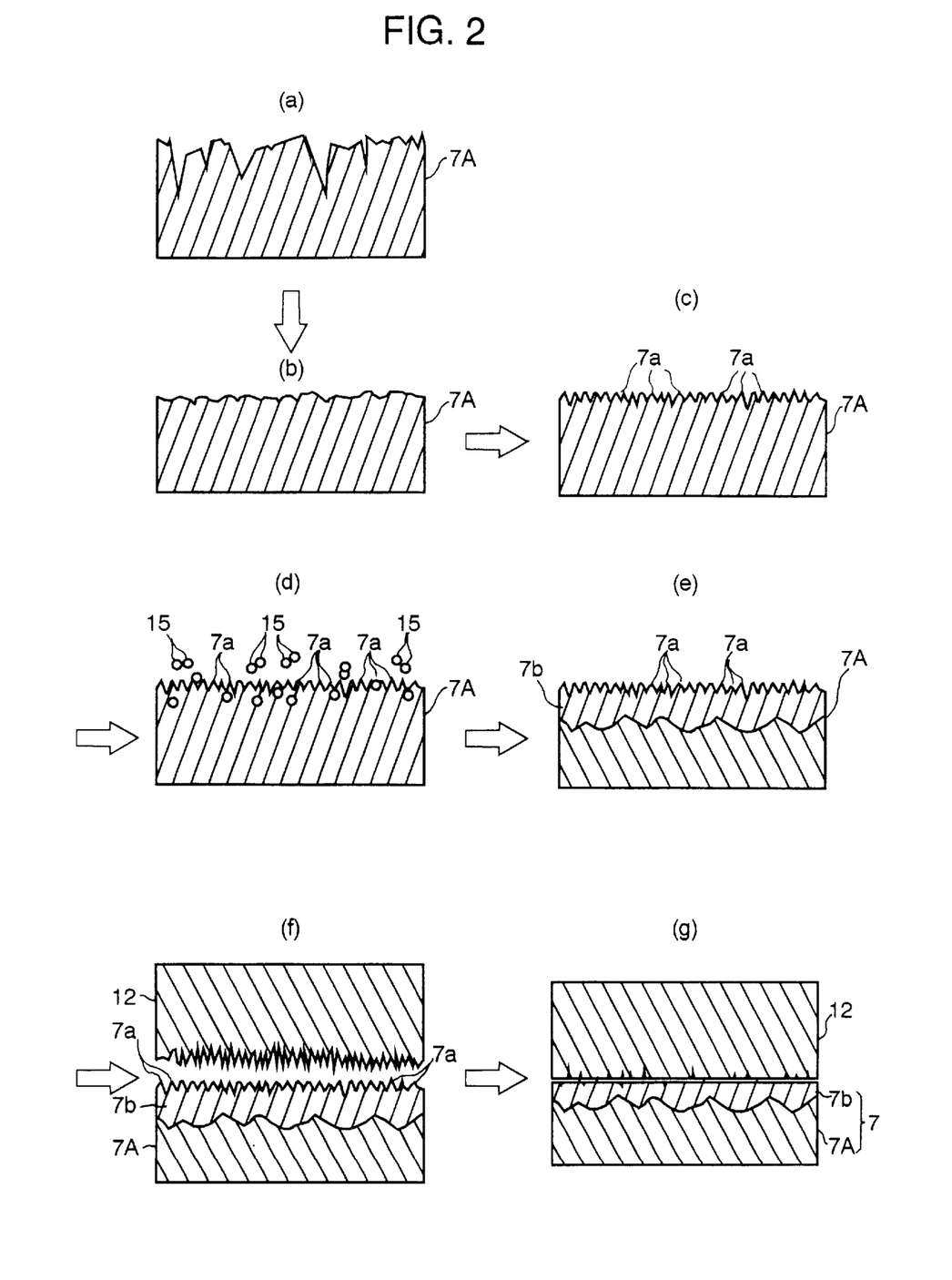
FIG. 2 is an illustration showing steps of the surface treating and smoothing method.
Figure 3:
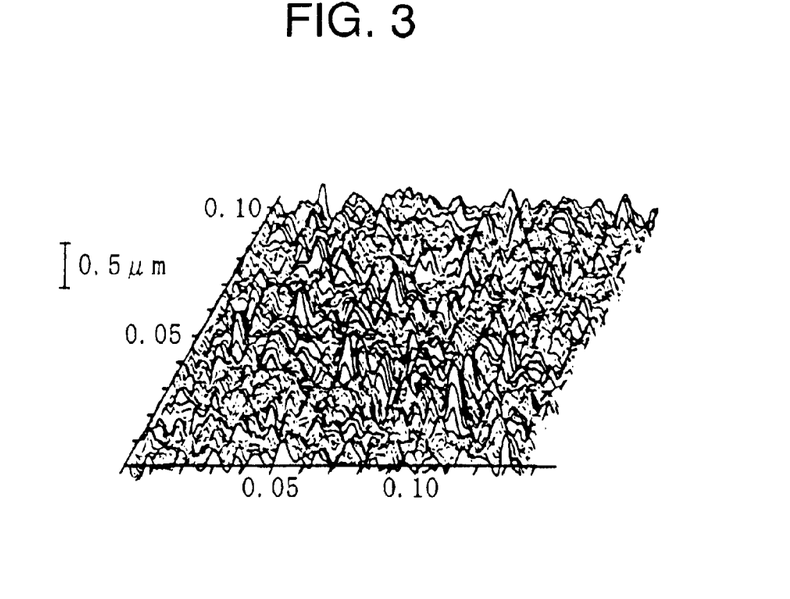
FIG. 3 is a pictorial view depicting a surface profile of the shim.

FIG. 2 shows a process comprising steps (a)–(g) of surface treatment of a chrome molybdenum steel shim 7 as a sliding member cooperative with, for example, a chilled iron cam 12 that has been finished without applying any surface treatment to a smooth surface with surface roughness ranging approximately 0.5 to 0.7 $\mu$mRa and surface hardness ranging approximately 520 to 560 Hv. The chrome molybdenum steel shim 7A (step (a)) that has a surface roughness higher than the chilled iron cam 12 is pre-finished by surface grinding or surface polishing to a smooth surface whose surface roughness is lower than the chilled iron cam 12 (step (b)), e.g. lower than approximately 0.2 $\mu$mRa, desirably. Thereafter, a surface treatment is applied to the surface the chrome molybdenum steel shim 7A by blasting a pressurized fluid, such as pressurized air and pressurized water, containing hard particles that is harder than the surface hardness of the chrome molybdenum steel shim 7A so as to finish it to a smooth surface with a surface roughness (center line mean surface roughness) ranging 0.01 to 1.0 $\mu$mRa (step (c)). Although various types of pressurized particle containing fluid blasting may be employed as the surface treatment, shot blasting is preferable for the surface treatment. The pressurized particle containing fluid blasting forms a number of minute projections 7a that are separately and approximately uniformly distributed over the surface of the chrome molybdenum steel shim 7A that has been pre-finished so as to have a relatively low surface roughness. FIG. 3 shows a surface of the chrome molybdenum steel shim 7A in profile finished by shot blasting by way of example. If the lower limit of the center line mean surface roughness is exceeded, it is impossible to smooth the pre-finished surface of the cam 12 as required when the chrome molybdenum steel shim 7A is firstly run in with the cam 12 as will be described later. On the other hand, if the upper limit of the center line mean surface roughness is exceeded, it is impossible to smooth its own surface thereof when the chrome molybdenum steel shim 7A is firstly run in with the cam 12. In the light of these verifications, the center line surface roughness of the chrome molybdenum steel shim 7A after the pressurized particle containing fluid blasting is limited to a range between 0.01 and 1.0 $\mu$mRa and, more preferably to a range between 0.02 and 0.7 $\mu$mRa. Thereafter, diffusion metalizing or cementation is applied to the chrome molybdenum steel shim 7A to force an element or elements 15 to diffuse and penetrate into a surface layer of the chrome molybdenum steel shim 7A (step (d)) so as thereby to form a hard compound surface layer 7b (step (e)). The surface hardness of the hard compound surface layer 7b has to have a surface hardness higher than that of the cam 12 but lower than 1500 Hv. At least one selected from a group of nitrogen, carbon and boron is used as an element for the hardening material. More specifically, for the hardening treatment, nitriding, such as salt-bath nitrocarburizing and gas nitrocarburizing, carburizing, and boronizing are appropriate. It is of course for forming a hard compound surface layer on the chrome molybdenum steel shim 7A to employ diffusion metalizing in which materials other than the above specified elements, nitrogen, carbon and boron. As a result of forming the hard compound surface layer 7b, while the chrome molybdenum steel shim 7A remains unchanged in its surface form and roughness, the minute projections 7a are hardened due to diffusion and penetration of the element. In other words, the minute projections 7a are not destroyed by the diffusion metalizing and remain almost unchanged in their shape.

After first installation of the shim 7A and the cam 12 thus prepared to the cylinder head 1, the engine is operated to drive the valve drive system for running-in of the shim 7A and the cam 12 thus prepared (step (f)). During initial operation for the running-in of the shim 7A and the cam 12 kept in sliding contact with each other, since the minute projections 7a on the surface shim 7A has hardness higher than the surface of cam 12, The minute projections 7a on the surface shim 7A, on one hand, grind and polish the surface of shim 7A to form a smooth surface on the shim 7A since they have hardness higher than the surface of cam 12 and, on the other hand, are easily rent apart from the shim 7 and smoothed since they are below in hardness than 1500 Hv although harder than the cam 12 and distributed separately and uniformly over the surface. By means of the initial running-in operation of the shim 7 and the cam 12 kept in contact with each other, the shim 7A and the cam 12 are finished to smooth surfaces (step (g)). Compound surface roughness of the shim 7 and the cam 12 is given by the following expression:

Resultant surface roughness={(surface roughness of the sliding member)²+(surface roughness of the counter member) ²}¹ᐟ²

The compound surface roughness of the shim 7 and the cam 12 is preferably less than 0.2 μmRa, which provides significantly small frictional resistance between them.

As described above, because after having pre-finished a ground or polished shim 7 by the pressurized particle containing fluid blasting to a surface with a surface roughness ranging from 0.01 to 1.0 μmRa, the shim 7 at its surface is hardened by diffusion metalizing treatment such as nitrocarburizing to form a hard compound surface layer that is harder than the cam 12, during initial operation of the valve drive system in which the shim 7 and the cam 12 are installed, the surfaces of the shim 7 and the cam 12 kept in sliding contact with each other are smoothed. Further, different from hardening the surface layer of the shim 7 by plating or thermal spraying, the diffusion metalizing does not cause a significant change in form of the surface of the shim 7, so that it is realized an ensured drop and stabilization of the frictional resistance between the shim 7 and the cam 12

The diffusion metalizing may be applied to the surface of the shim 7 not after but before execution of the pressurized particle containing fluid blasting. In such a case, however, since the hard compound surface layer of the shim 7 that is formed by the diffusion metalizing is possibly partly striped off, there is the necessity of making the hard compound surface layer thicker. Moreover, carburizing and quenching may be carried out before grinding and polishing the sliding surface of the shim 7 so as to make the surface layer of the shim 7 harder than the surface of the cam 12. In such a case, the shim 7 is increased in hardness not only at the sliding surface but also in the inside, in other words, can have an increased total case depth. Moreover, in the case of carburizing and quenching the shim 7 before grinding and polishing it, as long as the shim 7 at the surface layer is harder than the cam 12, the diffusion metalizing may or may not be carried out subsequently to the pressurized particle containing fluid blasting.

The surface treating method of the invention may b applied to the tappet 6 as a cam follower when the cam clearance is adjusted between the tappet 6 itself and the cam 12 or to a rocker arm as a cam follower in the rocker arm type of valve drive system. Moreover, the surface treating method of the invention can be applied to various types of sliding members which make sliding movement on another member.

Considerable testing and evaluation were carried out to demonstrate the effect of the method of the invention. Sample shims according to the above described embodiment and comparative shims were prepared and tested to verify a change in surface roughness with operating time. A test cam was made of a chilled iron and finished to a smooth sliding surface with surface roughness ranging approximately 0.5 to 0.7 μmRa and surface hardness ranging approximately 520 to 560 Hv. Sample shims SS-I to SS-IV and comparative shims CS-I to CS-VI were made of a molybdenum steel and surface treated by carburizing and quenching so as to have surface hardness ranging 700 to 750 Hv. After the carburizing and quenching treatment, the respective shim SS-I to SS-IV and CS-I to CS-VI were surface treated as shown in Table I.

TABLE I

| | Surface Roughness before Treatment (μmRa) | Shot Blasting Particle Size/surface Roughness (μmRa) | Type of Diffusion Metalizing |
|---|---|---|---|
| SS-I | 0.3 (barrel finishing after grinding) | #400/0.7 | salt-bath nitrocarburizing |
| SS-II | 0.01 (rapping) | #1200/0.15 | not applied |
| SS-III | 0.01 (finished by rapping) | #1200/0.15 | salt-bath nitrocarburizing |
| SS-IV | 0.01 (finished by rapping) | #800/0.18 | salt-bath nitrocarburizing |
| SS-V | 0.01 (finished by rapping) | #2000/0.06 | salt-bath nitrocarburizing |
| SS-VI | 0.01 (finished by rapping) | #3000/0.03 | salt-bath nitrocarburizing |
| CS-I | 0.3 (barrel finishing after grinding) | not applied | not applied |
| CS-II | 0.3 (barrel finishing after grinding) | not applied | salt-bath nitrocarburizing |
| CS-III | 0.01 (finished by rapping) | not applied | not applied |
| CS-IV | 0.01 (finished by rapping) | not applied | salt-bath nitrocarburizing |
| CS-V | 0.8 (barrel finishing after grinding) | #40/3.5 | not applied |
| CS-VI nitroc- | 0.01 (finished by rapping) | #60/1.55 | salt-bath arburizing |

The sample shims SS-I to SS-VI were treated by shot-blasting after pre-finished to sliding surfaces with surface roughness lower than that of the test cam and, thereafter further treated by salt-bath nitrocarburizing as diffusion metalizing. No diffusion metalizing was not applied to the sample shim SS-II. As mentioned above, by means of carburizing and quenching each sample shim was made harder than the test cam. The comparative shims CS-I and CS-III were pre-finished by grinding and polishing or rapping to sliding surfaces with surface roughness lower than that of the test cam. The comparative shim CS-I was similar to shims of valve systems used in gasoline engines. The comparative shims CS-II and CS-IV were treated by salt-bath nitrocarburizing only after pre-finished to sliding surfaces with surface roughness lower than that of the test cam. The treatment applied to the comparative shim CS-II was similar to what is generally applied to shims of valve systems used in diesel engines in order to improve wear resistance. The comparative shim CS-V was pre-finished to a sliding surface with surface roughness higher than that of the test cam and thereafter treated by shot-blasting so as to have surface roughness higher than 1.0 μmRa. The comparative shim CS-VI was treated by shot-blasting metalizing so as to have surface roughness higher than 1metalizing so as to have surface roughness higher than 1.0 μmRa after pre-finished to sliding surfaces with surface roughness lower than that of the test cam and, thereafter, further treated by salt-bath nitrocarburizing. In the shot-blasting applied to the sample shims SS-I to VI and the comparative shims V and VI, powdered alumina particles, whose particle sizes are shown in Table I, were injected as blasting particles at air pressure of 0.2 Mpa through a nozzle at a distance of 0.2 m from a shim surface.

Investigation of cross sections of the sample shims SS-I and SS-III after the salt-bath nitrocarburizing treatment proved that there was formed a hard compound surface layer comprising $Fe_4N$ and $Fe_3N$ whose thickness was in a range between approximately 10 and 12 $\mu m$. Investigation of the surface profile of the sample shim SS-III after the salt-bath nitrocarburizing treatment proved that there were formed a number of minute projections separately and uniformly distributed over the entire area of the surface as shown in FIG. 3.

Figure 4:
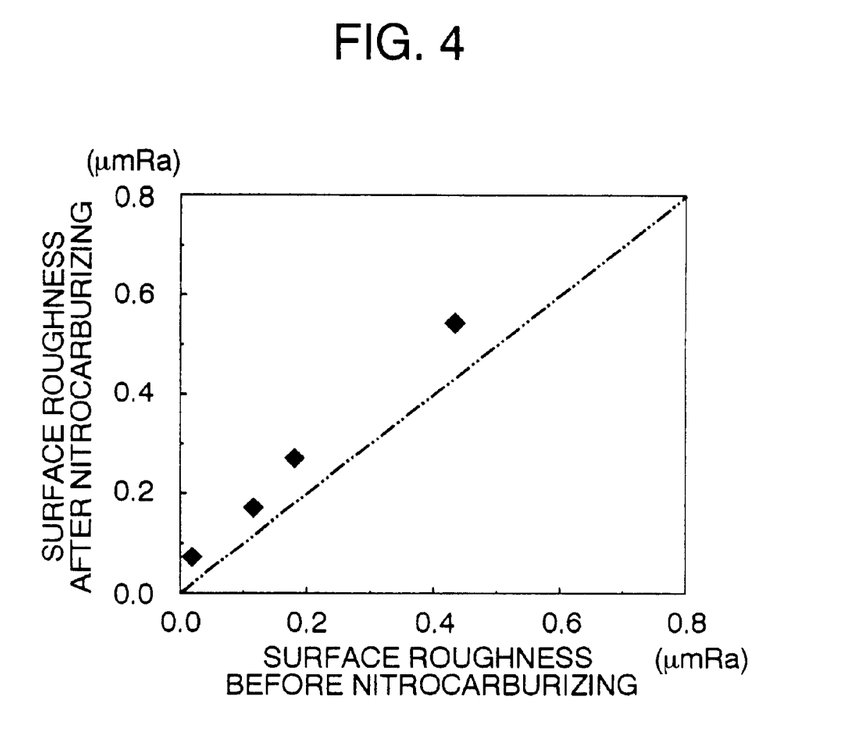
FIG. 4 is a graphical diagram showing shim surface roughness after salt-bath nitrocarburizing relative to shim surface roughness before salt-bath nitrocarburizing.

FIG. 4 shows the result of investigation which was made on various surface roughness of sliding surface of shims before and after nitrocarburizing treatment to figure out how the surface roughness changed due to the salt-bath nitrocarburizing treatment. FIG. 4 apparently demonstrates that a very slight increase in surface roughness occurs due to the nitrocarburizing treatment but is almost negligible (double-dotted line shows no change in surface roughness before and after the nitrocarburizing treatment). The reason for the occurrence of such a slight increase in surface roughness due to the nitrocarburizing treatment is generation of a very thin layer of oxide on the surface of the shim. However, since the layer of oxide is soft, it does not affect on a polishing effect against the cam. Accordingly, the surface profile of the shim is evaluated to be unchanged before and after nitrocarburizing treatment. The shim having the lowest surface roughness in FIG. 4 was not treated by shot-blasting but treated by salt-bath nitrocarburizing only, and the remaining shims were treated by shot-blasting and thereafter by salt-bath nitrocarburizing.

Figure 5:
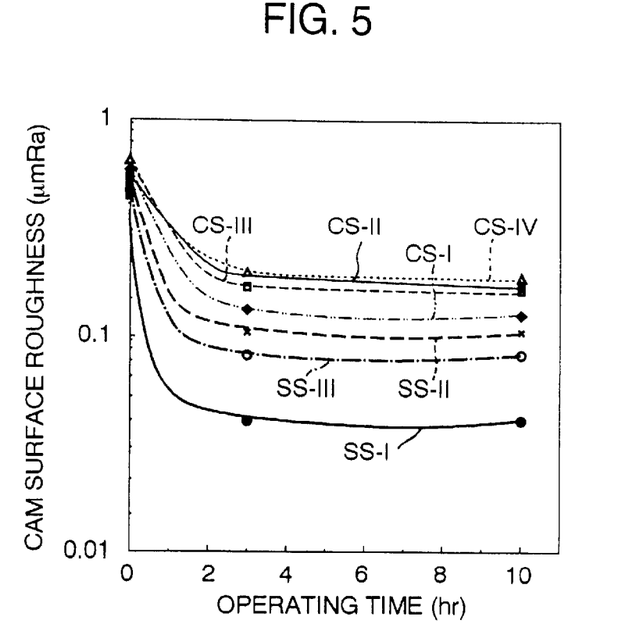
FIG. 5 is a graphical diagram showing a change in cam surface roughness relative to operation time.
Figure 6:
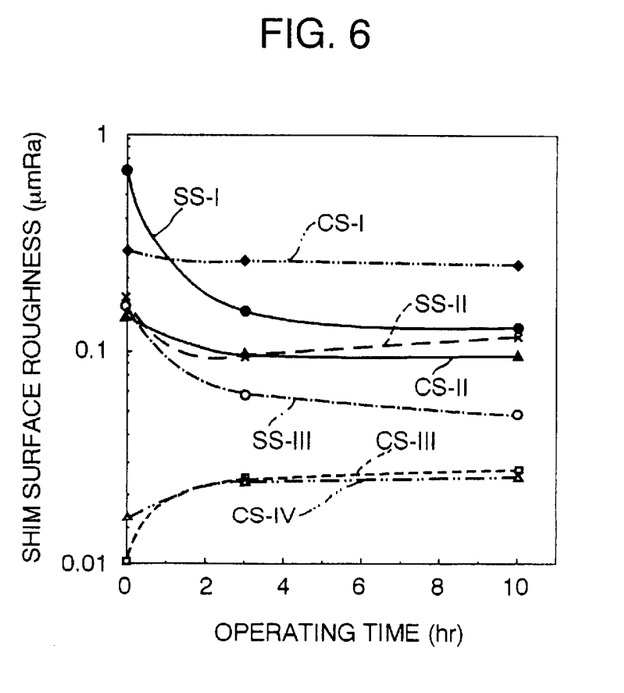
FIG. 6 is a graphical diagram showing a change in shim surface roughness relative to operation time.

Testing and evaluation were made on the respective sample shims SS-I to SS-VI and comparative shims CS-I to CS-VI in order to verify changes in surface roughness of the respective shims and test cam with operating time. Each shim and the test cam were installed into a calve system of a 16 valve, two-line four cylinder gasoline engine. The engine was operated by a motor at a speed of camshaft rotation of 350 rpm. The lubrication oil was of 10W30/80° C. Camshaft torque was measured as output torque of the motor. The test of the comparative shim CS-V was suspended because of an occurrence of scuffing during operation. The result is shown in Table II and FIGS. 5 and 6. It is demonstrated that both sample shims and cam cause greater increases in surface roughness than the comparative shims and become stable but no change after a 10 hours duration of operation thereof. This means that both sliding surfaces of each shim and cam are smoothed through an approximately 10 hours duration of initial operation thereof.

TABLE II

| | Cam | Shim |
| --- | --- | --- |
| SS-I | Caused the greatest drop in surface roughness among the eight | Surface roughness after a drop in surface roughness was lower than CS-I |
| SS-II | Caused drop in surface roughness greater than CS-I | Surface roughness after a drop in surface roughness was similar to SS-I |
| SS-III | Caused drop in surface roughness greater than CS-II | Caused a drop in surface roughness greater than CS-II |
| CS-I | Caused the greatest drop in surface roughness among CS-I to CS-V | Surface roughness was slightly dropped |

TABLE II-continued

| | Cam | Shim |
| --- | --- | --- |
| CS-II | Caused drop in surface roughness smaller than CS-I | Caused a drop in surface roughness slightly greater than CS-I |
| CS-III | Caused drop in surface roughness similar to CS-II | Showed a tendency to increase surface roughness during operation |
| CS-IV | Caused drop in surface roughness similar to CS-II | Showed a tendency to increase surface roughness during operation |
| CS-V | Test was suspended due to an occurrence of scuffing | — |

Figure 7:
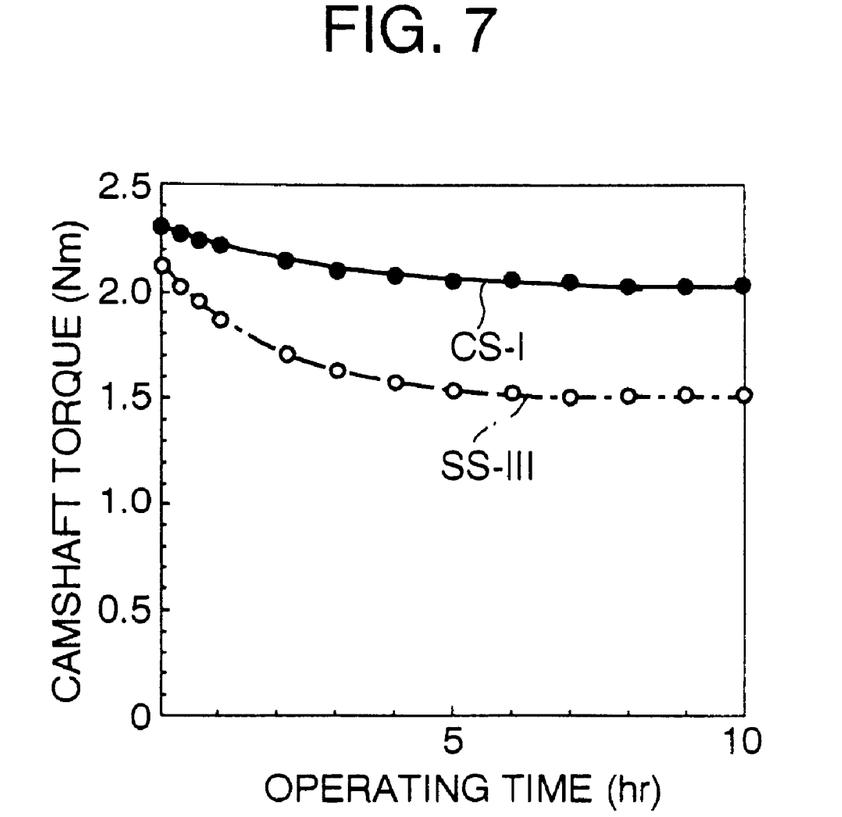
FIG. 7 is a graphical diagram showing a change in camshaft torque relative to operation time in connection with a sample shim SS-III and a comparative shim CS-I.

Testing and evaluation were further made on the sample shim SC-III and the comparative shim I in order to verify changes in camshaft torque with operating time, the result of which is shown in FIG. 7. As demonstrated in FIG. 7, the sample shim SC-III shows a significantly greater drop in sliding frictional resistance than the comparative shim CS-I.

Figure 8:
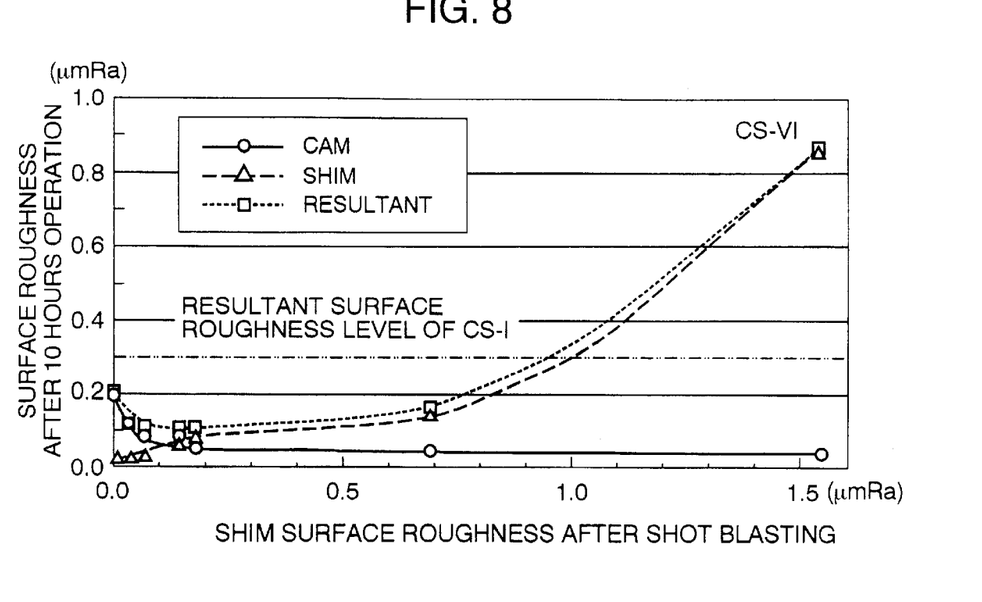
FIG. 8 is a graphical diagram showing changes in shim surface roughness, cam surface roughness and resultant surface roughness after 10 hours running-in operation relative to shim surface roughness after shot blasting treatment.
Figure 9:
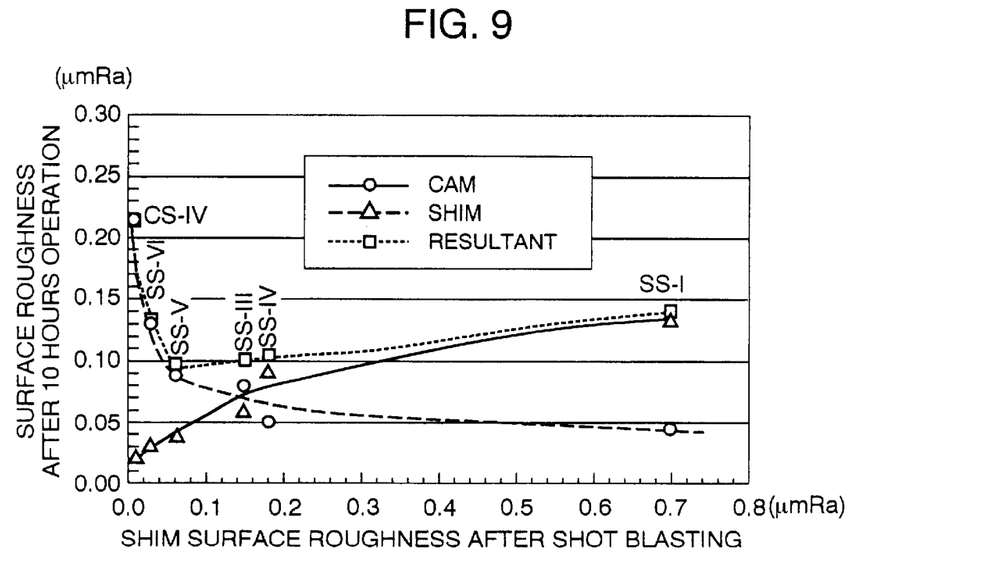
FIG. 9 is an enlarged graphical diagram showing of essential part of that shown in FIG. 8.

Testing and evaluation were made on the sample shims SS-I and SS-III to SS-VI and the comparative shim CS-IV and CS-VI in order to investigate surface roughness of both each shim and cam and resultant surface roughness of them after a 10 hours duration of operation relative to surface roughness of each shim after shot-blasting. The surface roughness and the resultant surface roughness after a 10 hours duration of operation and the surface roughness after shot-blasting are used to enter the vertical axis and the horizontal axis of a graph, respectively, in FIGS. 8 and 9. In FIG. 8, the resultant surface roughness of the comparative shim CS-I and a cam (which are generally used in a valve system of a gasoline engine) is shown for reference.

The resultant surface roughness is in a one-to-one relationship to camshaft torque as will be described later, and the camshaft torque, and hence sliding frictional resistance becomes smaller with a drop in resultant surface roughness of the shim and cam. As apparent in FIGS. 8 and 9, when using a shim finished by shot-blasting to a sliding surface with a surface roughness lower than 1.0 $\mu mRa$, the shim definitely provides a greater drop in resultant surface roughness, and hence in sliding frictional resistance, than the comparative shim CS-I. Further, when using a shim finished by shot-blasting to a sliding surface with a surface roughness in a range between 0.02 and 0.7 $\mu mRa$, the shim reduces its sliding frictional resistance to a significantly lower level.

Figure 10:
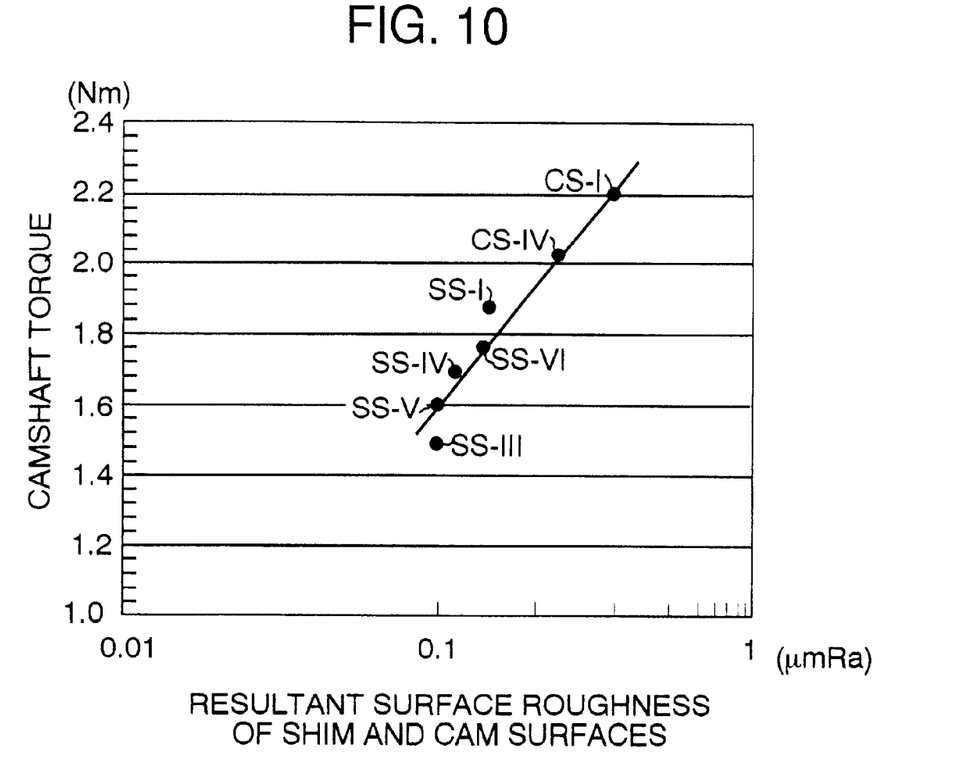
FIG. 10 is a graphical diagram showing camshaft torque after 10 hours running-in operation relative to resultant surface roughness of the shim and cam after 10 hours running-in operation.

Testing was made on the sample shims SS-I and SS-III to SS-VI and the comparative shim CS-I and CS-IV to investigate camshaft torque relative to resultant surface roughness of each shim and the test cam after a 10 hours duration of operation. The camshaft torque and the resultant surface roughness explained by the logarithms after a 10 hours duration of operation are used to enter the vertical axis and the horizontal axis of a graph, respectively, in FIG. 10. It is verified in FIG. 10 that the camshaft torque drops with a drop in the resultant surface roughness and when the resultant surface roughness is lower than 0.2 $\mu mRa$ and, when using a shim with a resultant surface roughness lower than 0.2 $\mu mRa$, the camshaft torque is lowered to a significantly low level.

While the invention has been described with respect to specific preferred embodiments thereof, it will be apparent that upon a reading and understanding of the foregoing, variations thereof may occur to those skilled in the art which lie within the scope of the appended claims.

What is claimed is:

1. A surface treating method of treating a sliding member which slides on a counter member with a surface kept in contact with a surface of the counter member, said surface treating method comprising the steps of:

pre-finishing said sliding member to a surface with a surface roughness lower than $0.2 \mu m$Ra;

blasting pressurized fluid containing particles harder than said surface of said sliding member on said surface of said sliding member after finished by said pre-finishing to finish said sliding member to a surface with a surface roughness ranging approximately 0.01 to 1.0 $\mu m$Ra; and hardening said surface of said sliding member by penetrating and diffusing an element in an inside of said sliding member after blasting said pressurized fluid on said surface of said sliding member so as to form a hard compound surface layer whose surface hardness is higher than the surface hardness of said counter member.

2. A surface treating method of treating a sliding member as defined in claim 1, wherein said surface of said sliding member is treated by said pressurized particle containing fluid blasting so as to have a surface roughness ranging approximately 0.02 to 0.7 $\mu m$Ra.

3. A surface treating method of treating a sliding member as defined in claim 1, wherein said surface of said sliding member is hardened to surface hardness lower than 1500 Hv.

4. A surface treating method of treating a sliding member as defined in claim 1, wherein at least one selected from a group of nitrogen, carbon and boron is used as said element for hardening said sliding member.

5. A surface treating method of treating a sliding member as defined in claim 1, wherein said sliding member is treated by carburizing and quenching and thereafter polished to a surface with surface roughness lower than that of said surface of said counter member.

6. A surface treating method of treating a sliding member as defined in claim 1, wherein said sliding member and said counter member are a cam follower and a cam, respectively, which are installed to a valve drive system for an engine.

7. A surface treating method of treating a sliding member which slides on a counter member with a surface thereof kept in contact with a surface of the counter member, said surface treating method comprising the steps of:

pre-finishing said sliding member to a surface with a surface roughness lower than a lower one of 0.2 $\mu m$Ra and the surface roughness of said counter member;

blasting pressurized fluid containing particles harder than said surface of said sliding member on said surface of said sliding member after finished by said pre-finishing to finish said sliding member to a surface with a surface roughness ranging approximately 0.02 to 0.7 $\mu m$Ra; and penetrating and diffusing an element in a surface layer of said sliding member after finished by said blasting so as to form a hard compound surface layer whose hardness is higher than said surface hardness of said counter member but lower than 1500 Hv.

8. A surface smoothing method of smoothing surfaces of a sliding member and a counter member which slide on each other with the surfaces thereof kept in contact with each other, said surface smoothing method comprising the steps of providing a sliding member by pre-finishing said sliding member to a surface with a surface roughness lower than the surface roughness of said counter member, blasting pressurized fluid containing particles harder than said surface of said sliding member on said surface of said sliding member to finish said sliding member to a surface with a surface roughness ranging approximately 0.01 to 1.0 $\mu m$Ra, and hardening said surface of said sliding member to surface hardness the surface hardness of said counter member applied in this order, and installing said sliding member and said counter member with said surfaces thereof in contact with each other; and driving said sliding member and said counter member so as to slide on each other for running-in, thereby smoothing said surfaces of said sliding member and said counter member.

9. A surface smoothing method as defined in claim 8, wherein said surfaces of said sliding member and said counter member are pre-finished such that said sliding member and said counter member gain resultant surface roughness smaller than 0.2 $\mu m$Ra after said running-in, said resultant surface roughness being given by the following expression:

Resultant surface roughness=$\{$(surface roughness of the sliding member)$^2$+(surface roughness of the counter member)$^2\}^{1/2}$.

10. A surface smoothing method of smoothing a sliding member as defined in claim 8, wherein said sliding member and said counter member are a cam follower and a cam, respectively, which are installed to a valve drive system for an engine.

* * * * *

UNITED STATES PATENT AND TRADEMARK OFFICE
CERTIFICATE OF CORRECTION

PATENT NO.    : 6,294,029 B1
DATED         : September 25, 2001
INVENTOR(S)   : Nobuo Sakate et al.

It is certified that error appears in the above-identified patent and that said Letters Patent is hereby corrected as shown below:

Column 11,
Line 7, delete "0.2µ$^m$Ra" and insert therefor -- 0.2µmRa --.

Column 12,
Line 24, after "hardness" insert -- higher than --.

Signed and Sealed this

Twenty-fourth Day of December, 2002

JAMES E. ROGAN
*Director of the United States Patent and Trademark Office*